United States Patent [19]

Typpo

[11] Patent Number: 5,010,766
[45] Date of Patent: Apr. 30, 1991

[54] ERROR COMPENSATION FOR MEASURING GAUGES

[75] Inventor: Pekka M. Typpo, Cupertino, Calif.

[73] Assignee: Impact Systems, Inc., San Jose, Calif.

[21] Appl. No.: 443,926

[22] Filed: Nov. 30, 1989

[51] Int. Cl.⁵ .......................... G01B 7/14; G01N 27/72
[52] U.S. Cl. .................................. 73/159; 324/207.26; 324/242; 250/358.1; 162/DIG. 6; 236/45
[58] Field of Search ................... 73/159; 324/227, 228, 324/242, 243, 207.26; 250/358.1; 162/DIG. 6; 236/45

[56] References Cited

U.S. PATENT DOCUMENTS

| | | |
|---|---|---|
| 3,306,103 | 2/1967 | Davis . |
| 3,614,450 | 10/1971 | Hill et al. ............................ 250/210 |
| 3,757,122 | 9/1973 | Bossen et al. ....................... 250/538 |
| 4,276,480 | 6/1981 | Watson . |
| 4,309,902 | 1/1982 | Sano et al. ............................ 73/159 |
| 4,453,404 | 6/1984 | Powell et al. ......................... 73/159 |
| 4,678,915 | 7/1987 | Dahlquist . |
| 4,789,820 | 12/1988 | Parrent, Jr. et al. .................. 73/159 |

Primary Examiner—Daniel M. Yasich
Attorney, Agent, or Firm—Flehr, Hohbach, Test, Albritton & Herbert

[57] ABSTRACT

A measuring gauge for error compensation of a measured characteristic of a moving sheet measures X, Y lateral displacement of the upper and lower transducer heads of a moving scanner in a cross direction across the paper. This is accomplished by the use of two pairs of eddy current sensors centered on a target on the opposed transducer head. Such eddy current transducers sense the pairs of edges of an aperture in the opposed transducer. Alternatively, slope portions of the lower transducer head are sensed. Other correction inputs are provided by measuring the distance from each transducer head to the moving sheet to provide a "Z" correction. All of the foregoing are then utilized along with caliper measurements, if necessary, to provide a corrected characteristic.

9 Claims, 3 Drawing Sheets

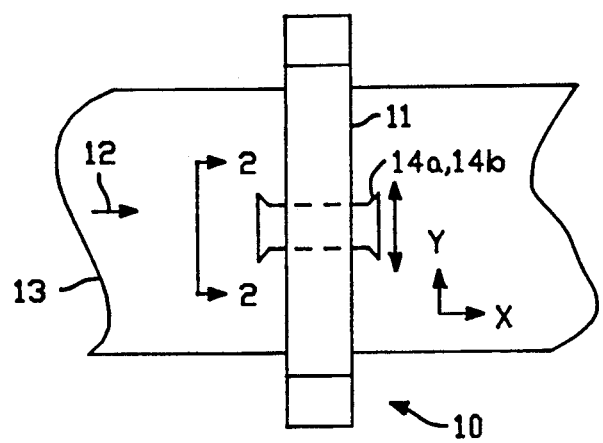
FIG.-1
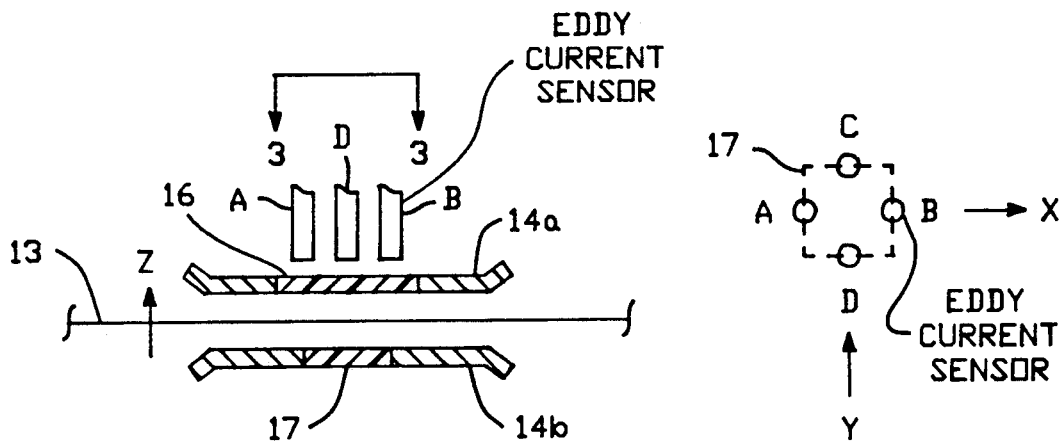
FIG.-2
FIG.-3
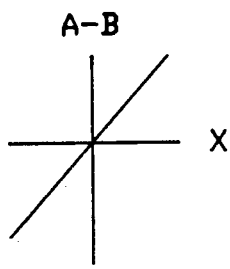
FIG.-4A
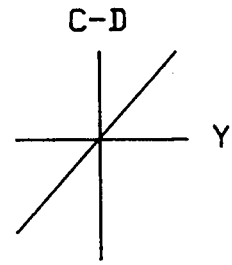
FIG.-4B

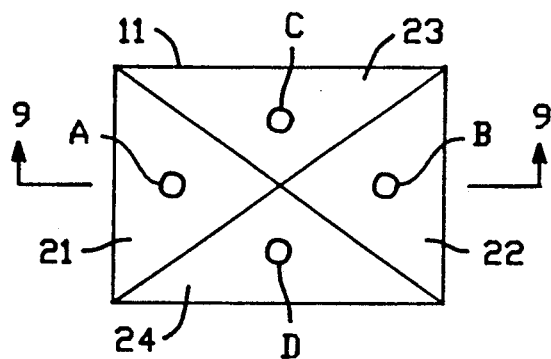
FIT.-8
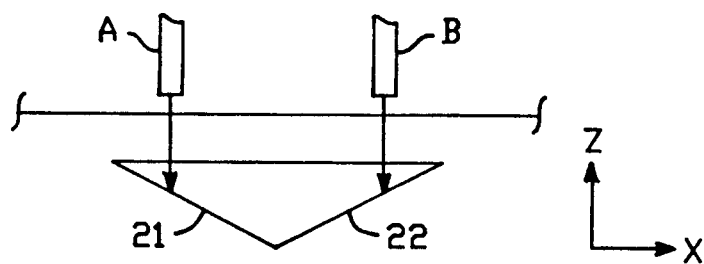
FIG.-9
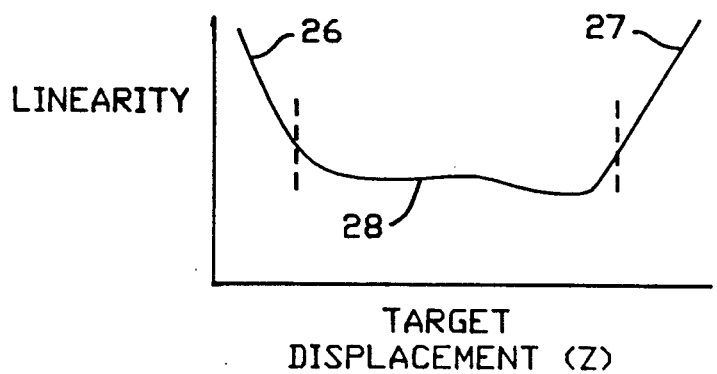
FIG.-10

ERROR COMPENSATION FOR MEASURING GAUGES

This invention relates to measuring gauges for measuring a characteristic of moving sheet material as, for example, the basis weight or moisture content of the material and where the gauges are caused to traverse the material. Error compensation is provided for the measured characteristics.

BACKGROUND OF THE INVENTION

In measuring basis weight or moisture of moving sheet material a radiation source of either, for example, ionizing radiation or infrared is mounted on one side of the sheet material and opposite on the other side is a receiving transducer. The pairs of transducers are then scanned in a cross-direction (perpendicular to the moving or machine direction of the sheet material) to provide a cross-direction profile of that particular characteristic. Due to mechanical imperfections of the transverse mechanisms and the sensitivity of the measuring transducers themselves, a constant positional relationship both in a Z direction, which is perpendicular to the moving sheet, and X, Y directions which are in the plane of the moving sheet are not always maintained. Thus, the characteristic measurements are affected by these relative movements of the transverse mechanisms.

One form of correction is illustrated in Davis U.S. Pat. No. 3,306,103 where screws are preset for each zone or slice of the sheet material to compensate for expected errors. FIG. 2 of Davis illustrates a pair of scanning heads 13 and 14 having a pair of transducers mounted in opposed heads; namely, a radiation source and ionization chamber for determining basis weight. FIG. 5 of the present invention shows similar units 31 and 32. As Davis points out, a change in the positional relationship of the source and the chamber will cause measurement error (Column 1, lines 23-27).

In Watson U.S. Pat. No. 4,276,480 changes in relative relationship are sensed by measuring the distance of the transducer to a reference, such as a taut metal tape.

Finally, Dahlquist U.S. Pat. No. 4,678,915 utilizes an electromagnetic signal transmitted through the sheet material for sensing the distance between traversing transducers. X and Y displacement in the plane of the moving sheet is apparently compensated for but not measured directly.

OBJECT AND SUMMARY OF THE INVENTION

It is therefore a general object of the present invention to provide improved error compensation for measuring gauges.

In accordance with the above object there is provided apparatus for measuring a characteristic of a moving sheet material, including a pair of transducers spaced opposite each other with the sheet therebetween and mounted to traverse across the direction of movement of the moving sheet, the transducers being subject to mechanical error in both a lateral relationship (X, Y) and spacing therebetween Z. The apparatus comprises means for measuring at least the X, Y displacement, including two pairs of eddy current sensors mounted with one transducer and responsive to a target associated with the other transducer for providing X, Y relative displacement data and means as provided for correcting the measured characteristic by use of the X, Y data.

BRIEF DESCRIPTION OF THE DRAWINGS

FIG. 1 is a plan view of a scanning system utilizing the present invention.

FIG. 2 is a simplified cross-sectional view taken along the line 2—2 of FIG. 1.

FIG. 3 is a simplified plan view taken along the line 3—3 of FIG. 2.

FIGS. 4A and 4B are characteristic curves useful in understanding the operation of FIG. 3.

FIG. 8 is a plan view of an alternative embodiment of FIG. 3.

FIG. 9 is a simplified cross-sectional view taken substantially along the line 9—9 of FIG. 8.

FIG. 10 is a characteristic curve useful in understanding the present invention.

DETAILED DESCRIPTION OF PREFERRED EMBODIMENTS

Figure 5:
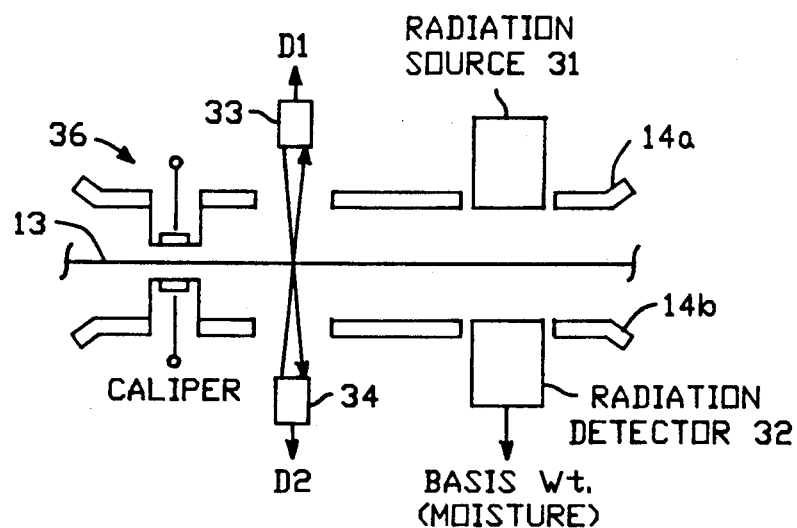
FIG. 5 is a cross-sectional view similar to FIG. 2 but showing the location of transducers for measuring characteristics of a moving sheet.

FIG. 1 shows the scanner unit 10 which has a pair of cross beams 11 perpendicular to the machine direction 12 in which, for example, a paper sheet 13 is moving. Mounted to traverse across this sheet in a cross (Y) direction are a pair of measuring heads—an upper head 14a and a lower head 14b. Moving sheet or machine direction is shown by the X axis. Thus, the X, Y axis is substantially in the plane of the moving sheet.

As the measuring heads scan the sheet in the Y direction, as shown by double-headed arrow 15, it is divided into nominal zones or slices and measurement is made at each one of these zones to thus provide a suitable cross direction profile as to a characteristic of the sheet; for example, basis weight and moisture are two typical characteristics used in the paper manufacturing process. This invention, of course, relates to other types of measurements including coatings and materials other than paper.

FIG. 2 is a cross section of a portion of the measuring heads 14a and 14b of FIG. 1. The upper head 14a includes a relatively large aperture 16 filled with an insulating material (non-metallic) and the lower head 14b has a smaller square or rectangular aperture 17 also filled with insulating material.

As better illustrated in FIG. 3, the aperture 17 has one pair of parallel edges on which are centered eddy current sensors A and B and a second pair of edges on which are substantially centered eddy current sensors C and D. It is apparent that the aperture 16 is large enough so that the metal plate forming the bottom portion of upper head 14a causes no interference with these sensors. And on the other hand, the edges of aperture 17 are formed of the metal material and are in effect a target for the eddy current sensors. And such target, when it shifts in the X and Y directions as indicated, provides by subtraction of the signals from the A and B sensors (as illustrated in FIG. 4A) a measured X displacement and by subtraction of the C and D signals, as illustrated in FIG. 4B, an indication of Y displacement.

Such eddy current sensors A, B, C and D are well known in the art and, for example, are obtainable from Kaman Corp. of Colorado Springs, Colo. In effect, the sensor induces a current flow on the surface of the target which is called an "eddy current." This induced current produces an opposing magnetic field and thus the resultant change in the impedance of the exciting coil is related to the distance that the target is away from the eddy current sensor. Normally the Z displacement is all that is measured by a standard sensor; however, in accordance with the present invention the lateral displacement can also be sensed by the technique of utilizing a pair of eddy current sensors and subtracting signals from respective pairs on parallel edges of a square.

FIGS. 8 and 9 illustrate an alternative embodiment where, rather than an aperture, a sloped plate 17' is utilized with one pair of plate sections 21 and 22 having a slope in the X, Z plane and the other pair of plate sections 23 and 24 having a slope in the Y, Z plane. It is obvious that when, for example, eddy current sensors A and B, as illustrated in FIG. 9, are equally centered on the sloped portions of the plates, a zero signal will occur as it does in the case of FIG. 4A. And lateral movement will cause a shift of the signal depending on the direction of movement. Thus, the characteristic curves of FIGS. 4A and 4B also apply. Such signal shift is due to the normal operation of an eddy current sensor which, in response to target displacement, varies its output signal magnitude.

In order to gain more sensitivity the target is spaced a distance from the eddy current sensors, as illustrated in FIG. 10, so that the non-linear portion of the measuring curve illustrated by the lower section 26 and the upper section 27 will be utilized. In a normal measurement only the flatter central section 28 would be used. Thus, utilizing the non-linear sections of the sensitivity curve provides a special sensitivity when X, Y lateral displacement is being measured.

Figure 6:
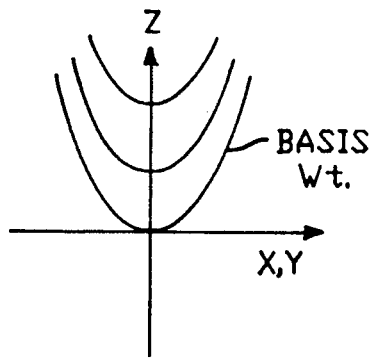
FIG. 6 are characteristic curves useful in understanding the correction provided by the invention.

To conduct a measurement of a characteristic such as basis weight or moisture of a moving sheet material, FIG. 5 illustrates the placement on upper head 14$a$ lower head 14$b$ of a radiation source 31 and radiation detector 32. By the use of either ionizing radiation or infrared and well known techniques, these will measure basis weight or moisture. Such measurement of basis weight is shown in U.S. Pat. No. 3,757,122 and of moisture in U.S. Pat. No. 3,614,450. However, as illustrated in FIG. 6 such subject to displacement errors either both in the Z and the X, Y directions. To measure the Z displacement FIG. 5 shows a radiation source unit 33 and a unit 34 on the opposite sides of the sheet 13 which, by well known laser beam technique or other non-electromagnetic technique, measures the distance from that transducer, upper or lower, to the surface of the sheet; thus D1 represents the distance of the upper head transducer to the sheet material 13 and D2 the distance of the lower transducer head.

Finally, if the thickness of the paper is appreciable or resolution of measurement desired is great, a caliper unit 36 (see U.S. Pat. No. 4,791,450) may be utilized to provide the thickness of the paper.

Figure 7:
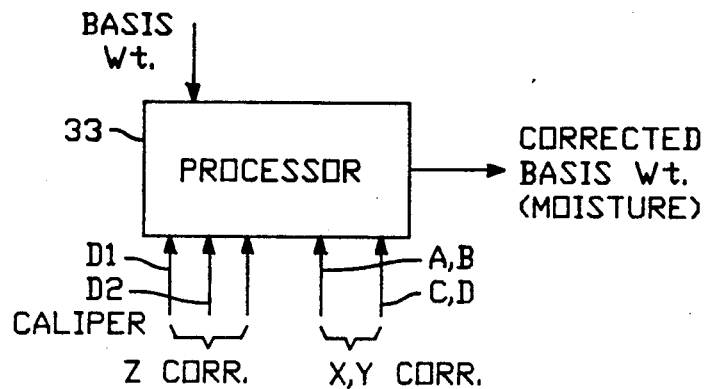
FIG. 7 is a block diagram showing the correction technique of the present invention.

As illustrated in FIG. 7, a processor 37 receives all of the information, for example, for the Z correction the D1, D2 and caliper measurements (FIG. 5), and for the X, Y correction, the A, B, C a signal outputs of the respective eddy current sensors (FIG. 3). With a set of such as FIG. 6 (with, for example, as illustrated, basis weight being a parameter) being stored in the processor 37, these values then provide a corrected basis weight or moisture output or whatever other similar characteristic is being measured. Namely, the Z correction in the vertical axis and the X and Y correction on the horizontal axis provides such correction. The derivation and use of such curves is shown in the above Watson patent.

Thus, improved error compensation for a measuring gauge useful in measuring characteristics of a moving sheet has been provided.

I claim:

1. Apparatus for error compensating a measured characteristic of a moving sheet material, including a pair of transducers for measuring said characteristic spaced opposite each other with the sheet therebetween and mounted on opposite scanning heads to traverse across the direction of movement of the moving sheet, the transducers along with said scanning heads being subject to mechanical displacement error in both a lateral relationship (X,Y) parallel to the plane of the moving sheet and in a vertical direction perpendicular to the sheet where the spacing Z between the heads may change, said error compensating apparatus comprising:
   metal target means mounted on said one scanning head,
   means mounted on said other scanning head opposite said target means for measuring at least said X, Y displacement error, including two pairs of eddy current sensors mounted with one scanning head, each of said sensors generating an output signal related to its distance from a portion of said target opposite such sensor, an eddy current being induced in said target portion by said sensor, the combined said signals of one said pair of sensors indicating X displacement error and said other pair Y displacement error;
   process means responsive to said X, Y displacement errors for correcting said measured characteristic.

2. Apparatus as in claim 1 including means for measuring said Z displacement error, said processor means being responsive to said Z measured error for correcting said measured characteristic.

3. Apparatus as in claim 2 where said Z displacement measuring means includes a pair of transducer means mounted on said opposed scanning heads for measuring the respective distances from each of such transducer means to the surface of said moving sheet.

4. Apparatus as in claim 3 where said Z measuring means includes caliper measuring means mounted on said scanning heads for said sheet.

5. Apparatus as in claim 1 wherein said target mounted on said one scanning head is in the form of a rectangular aperture in a metal plate facing said moving sheet and parallel thereto and where each pair of said sensors is nominally centered on a pair of parallel edges of said rectangular aperture for measuring displacement of said eddy current sensors with respect to a pair of said aperture edges respectively in the X and Y directions.

6. Apparatus as in claim 5 where said rectangular aperture is filled with non-metallic insulating material.

7. Apparatus as in claim 1 where said target associated with said one scanning head is in the form of a sloped metal plate substantially located adjacent to said moving sheet, said plate having one pair of slopes of opposite type in a plane defined in the X, Z axes and another pair of opposite slopes in the plane defined by the Y, Z axes.

8. Apparatus as in claim 1 where said eddy current sensors are operated in a non-linear portion of their displacement sensitivity curve to thus make them more sensitive to lateral X, Y target displacement as opposed to Z target displacement.

9. Apparatus as in claim 1 where signals from each pair of said sensors are subtracted from one another to provide a respective indication of X and Y displacement.

* * * * *